United States Patent
Wang et al.

(10) Patent No.: US 8,375,042 B1
(45) Date of Patent: Feb. 12, 2013

(54) INDEX-SIDE SYNONYM GENERATION

(75) Inventors: Tracy Wang, San Jose, CA (US);
Dimitra Papachristou, Palo Alto, CA (US); Moustafa A. Hammad, Santa Clara, CA (US); Jose Antonio Ramirez-Robredo, San Francisco, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 12/942,965

(22) Filed: Nov. 9, 2010

(51) Int. Cl.
*G06F 17/30* (2006.01)
(52) U.S. Cl. .................................. 707/759; 707/741
(58) Field of Classification Search .................. None
See application file for complete search history.

(56) References Cited

U.S. PATENT DOCUMENTS

| | | | | |
|---|---|---|---|---|
| 2003/0126117 | A1* | 7/2003 | Megiddo et al. | 707/3 |
| 2003/0200199 | A1* | 10/2003 | Snyder | 707/2 |
| 2004/0148170 | A1* | 7/2004 | Acero et al. | 704/257 |
| 2008/0071757 | A1* | 3/2008 | Ichiriu et al. | 707/4 |
| 2009/0089277 | A1* | 4/2009 | Cheslow | 707/5 |

OTHER PUBLICATIONS

Leah S. Larkey, Lisa Ballesteros, and Margaret E. Connell. 2002. Improving stemming for Arabic information retrieval: light stemming and co-occurrence analysis. In Proceedings of the 25th annual international ACM SIGIR conference on Research and development in information retrieval (SIGIR '02). ACM, New York, NY, USA, 275-282. DOI=10.1145/564376.5.*

MIT.EDU, Natural Language Tools. 2010. http://web.archive.org/web/20100420052323/http://csc.media.mit.edu/docs/conceptnet/nl.html.*

* cited by examiner

*Primary Examiner* — Syed Hasan
(74) *Attorney, Agent, or Firm* — Fish & Richardson P.C.

(57) ABSTRACT

Methods, systems, and apparatus, including computer programs encoded on computer storage media, for index-side synonym expansion. One method includes indexing a token from a resource, including determining that the token comprises a numeric portion and storing data associating the resource with both the particular token and the numeric portion in a search engine index. Another method includes indexing a token from a resource, including normalizing the token by removing a prefix matching a stopword prefix and storing data associating the resource with both the token and the normalized form of the token in a search engine index. Another method includes creating a token blacklist.

17 Claims, 6 Drawing Sheets

INDEX-SIDE SYNONYM GENERATION

BACKGROUND

This specification relates to identifying resources relevant to search queries submitted to a search engine.

Search engines identify digital resources (e.g., Web pages, images, text documents, multimedia content) that are responsive to search queries, and provide information on the identified resources. In general, search engines match terms of the search queries to terms in the resources or metadata associated with the resources to determine which resources are responsive to which queries.

Multiple words can be used to describe a similar concept (for example, "car," "cars," "automobile," and "automobiles"). The word used in or to describe a particular resource may not exactly match the word used in a search query. Therefore, to identify additional resources relevant to search queries, some conventional search engines perform query expansion, augmenting search queries with synonyms for words in the queries. For example, a search query for "red car" could be augmented to be "red (car OR cars OR automobile OR automobiles)," because "car," "cars," "automobile," and "automobiles" have similar meanings. However, because search queries often include multiple terms, and each term in a search query can have multiple synonyms, it can be difficult to add all relevant synonyms to a received search query.

SUMMARY

This specification describes technologies relating to indexing resources and identifying resources responsive to user search queries.

To reduce the amount of query expansion that needs to be done when a search query is received from a user, a search system augments its search index with synonyms for words found in resources. Specifically, the search system adds one or more of numeric portions from numeric compounds or prefix normalized forms of words. The search system then augments received queries with information needed to match the augmented index.

In general, one innovative aspect of the subject matter described in this specification can be embodied in methods that include the actions of obtaining a token sequence for a resource, wherein each token comprises one or more characters; and indexing a particular token in the token sequence, the indexing comprising: determining that the particular token comprises a numeric portion of one or more contiguous numeric characters and a non-numeric portion of one or more non-numeric characters; extracting the numeric portion from the particular token; and storing data associating the resource with both the particular token and the numeric portion, but not the non-numeric portion, as index terms for the resource, in a search engine index. Other embodiments of this aspect include corresponding systems, apparatus, and computer programs recorded on computer storage devices, each configured to perform the operations of the methods.

These and other embodiments can each optionally include one or more of the following features. The token sequence comprises tokens extracted from the resource or from metadata for the resource. A beginning of the numeric portion is delimited by a beginning of the token or a non-numeric character and an end of the numeric portion is delimited by an end of the token or a non-numeric character. Indexing the particular token further comprises determining that the particular token comprises a second numeric portion; and associating the resource with the second numeric portion in the search engine index. The actions further include storing data associating the particular token with the numeric portion. The actions further include determining a respective position of the numeric portion in the particular token relative to the non-numeric portion; and associating the particular token with the numeric portion further comprises associating the numeric portion with the respective position relative to the non-numeric portion. The actions further include storing data indicating that the numeric portion is a numeric portion. Storing data indicating that the numeric portion is a numeric portion comprises adding a prefix to the numeric portion before associating the resource with the numeric portion in the search engine index.

The actions further include receiving a search query that contains one or more tokens including a number token; and augmenting the search query with a new token that will match any numeric portions that (i) were extracted from tokens in resources and (ii) match the number token. The actions further include assigning a weight to each token in the augmented search query, including assigning a weight to the new token so that resources matching the number token in the search query are weighted more highly than resources matching the new token.

In general, another innovative aspect of the subject matter described in this specification can be embodied in methods that include the actions of indexing resources in a language, wherein stopwords in the language can appear as prefixes of words in the language; obtaining a blacklist comprising one or more words that each begin with a prefix matching one of a plurality of stopword prefixes, wherein, for each word on the blacklist, the prefix does not act as a stopword in a context of the word; obtaining a token sequence for a resource, wherein the token sequence comprises tokens extracted from the resource, and wherein each token comprises one or more characters; and indexing a particular token in the token sequence that begins with a prefix that matches a stopword prefix, the indexing comprising: determining that the particular token is not included in the blacklist; generating a normalized form of the particular token, including removing the prefix matching the stopword prefix from the beginning of the particular token; and storing data associating the resource with both the particular token and the normalized form of the particular token, as index terms for the resource, in a search engine index. Other embodiments of this aspect include corresponding systems, apparatus, and computer programs recorded on computer storage devices, each configured to perform the operations of the methods.

These and other embodiments can each optionally include one or more of the following features. The token sequence comprises tokens extracted from the resource or from metadata for the resource. The normalized form of the particular token is different from the particular token. The actions further include indexing a second token in the token sequence, the indexing comprising: generating a normalized form of the second token; determining that the normalized form of the second token is the same as the second token; and in response to determining that the normalized form of the second token is the same as the second token, storing data associating the resource with the second token, but not the normalized form of the second token, in the search engine index. Storing data associating the resource with the normalized form of the particular token comprises storing data indicating that the normalized form of the particular token is a normalized form. Storing data indicating that the normalized form of the particular token is a normalized form comprises adding a prefix to the normalized form before associating the resource with the normalized form. The actions further include associating the particular token with the normalized form of the particular token in the search engine index.

The actions further include receiving a search query comprising one or more tokens; generating a normalized form of a first token in the search query, wherein generating the normalized form comprises removing a prefix matching a stopword prefix from the token; and augmenting the query with the normalized form. The actions further include determining that the normalized form is different from the first token; and augmenting the search query comprises augmenting the search query to include both the normalized form and the normalized form with information identifying the normalized form as a normalized form. The actions further include receiving a search query comprising one or more tokens; generating a normalized form of a first token in the search query; determining that the normalized form is the same as the first token; and augmenting the search query to include the normalized form with information identifying the normalized form as a normalized form. The actions further include determining that the first token is not included in a blacklist comprising one or more words that each begin with one of a plurality of stopword prefixes, wherein, for each word in the blacklist, the stopword prefix does not act as a stopword in a context of the word. The actions further include assigning a weight to each token in the query augmented with the normalized form, including assigning a weight to the normalized form so that resources matching the first token in the search query are weighted more highly than resources matching the normalized form and not the first token.

In general, another innovative aspect of the subject matter described in this specification can be embodied in methods that include the actions of creating a token blacklist, wherein a token within the token blacklist has a prefix character sequence that matches a reference stopword prefix but does not act as a stopword prefix in the context of the token, by performing operations comprising: obtaining a set of reference stopword prefixes, wherein each reference stopword prefix is a sequence of characters; obtaining a token dataset of tokens, wherein the token dataset comprises data identifying a plurality of whole tokens and a frequency of occurrence of each whole token within a training dataset; selecting a whole token from the token dataset if the whole token has a frequency that is greater than a frequency threshold value, and if the whole token has a prefix character sequence that matches a reference stopword prefix; generating a normalized token by removing a longest matched reference stopword prefix from the whole token; determining whether or not the normalized token has a prefix character sequence that matches a reference stopword prefix; and adding a first normalized token to the blacklist if a prefix character sequence of the first normalized token matches a reference stopword prefix. Other embodiments of this aspect include corresponding systems, apparatus, and computer programs recorded on computer storage devices, each configured to perform the operations of the methods.

These and other embodiments can each optionally include one or more of the following features. The operations further comprise adding a second whole token to the blacklist if no prefix character sequence of a second normalized token corresponding to the second whole token matches a reference stopword prefix, and if a ratio of (i) a frequency of the second normalized token to (ii) a frequency of the second whole token is less than a threshold value. The set of reference stopword prefixes comprises a plurality of single stopword prefixes and a compound stopword prefix that is a sequence of a plurality of single stopword prefixes, and generating the token dataset comprises: selecting a first token from the training dataset; adding the first token and its frequency of occurrence within the training dataset to the token dataset; determining that a prefix character sequence of the first token matches a reference compound stopword prefix; and successively stripping a leading reference single stopword prefix from the first token and adding the stripped first token and a frequency of occurrence within the training dataset of the stripped first token to the token dataset until all single stopword prefixes within the reference compound stopword prefix sequence are stripped from the first token. Generating the token dataset further comprises: selecting a second token from the training dataset; adding the second token and its frequency of occurrence within the training dataset to the token dataset; determining that a prefix character sequence of the second token does not match a reference compound stopword prefix and does match a reference single stopword prefix; and stripping the reference single stopword prefix from the second token and adding the stripped second token and a frequency of occurrence within the training data set of the stripped second token to the token dataset.

In general, another innovative aspect of the subject matter described in this specification can be embodied in methods that include the actions of obtaining a set of reference stopword prefixes, wherein each reference stopword prefix is a sequence of characters; obtaining a token dataset of tokens, wherein the token dataset comprises data identifying a plurality of whole tokens and a frequency of occurrence within a training dataset for each of the whole tokens; selecting a whole token from the token dataset if the whole token has a frequency that is greater than a frequency threshold value, and if the whole token has a prefix character sequence that matches a reference stopword prefix; generating a normalized token by removing a longest matched reference stopword prefix from the whole token; determining whether or not the normalized token has a prefix character sequence that matches a reference stopword prefix; and adding a first whole token to the blacklist if a prefix character sequence of a first normalized token does not match a reference stopword prefix, and if a ratio of (i) a frequency of the first normalized token to (ii) a frequency of the first whole token is less than a threshold value. Other embodiments of this aspect include corresponding systems, apparatus, and computer programs recorded on computer storage devices, each configured to perform the operations of the methods.

These and other embodiments can each optionally include one or more of the following features. The actions further include adding a second normalized token to the blacklist if a prefix character sequence of the second normalized word matches a reference stopword prefix. The set of reference stopword prefixes comprises a plurality of single stopword prefixes and a compound stopword prefix that is a sequence of a plurality of single stopword prefixes, and generating the token dataset comprises: selecting a first token from the training dataset; adding the first token and its frequency of occurrence within the training dataset to the token dataset; determining that a prefix character sequence of the first token matches a reference compound stopword prefix; and successively stripping a leading reference single stopword prefix from the first token and adding the stripped first token and a frequency of occurrence within the training dataset of the stripped first token to the token dataset until all single stopword prefixes within the reference compound stopword prefix sequence are stripped from the first token. Generating the token dataset further comprises selecting a second token from the training dataset; adding the second token and its frequency of occurrence within the training dataset to the token dataset; determining that a prefix character sequence of the second token does not match a reference compound stopword prefix and does match a reference single stopword prefix; and stripping the reference single stopword prefix from the second token and adding the stripped second token and a frequency of occurrence within the training data set of the stripped second token to the token dataset.

Particular embodiments of the subject matter described in this specification can be implemented so as to realize one or more of the following advantages. Resources responsive to search queries can be identified, even when the resources do not contain the exact words used in the search queries. Resources responsive to search queries can be identified without adding a large number of synonyms to search queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
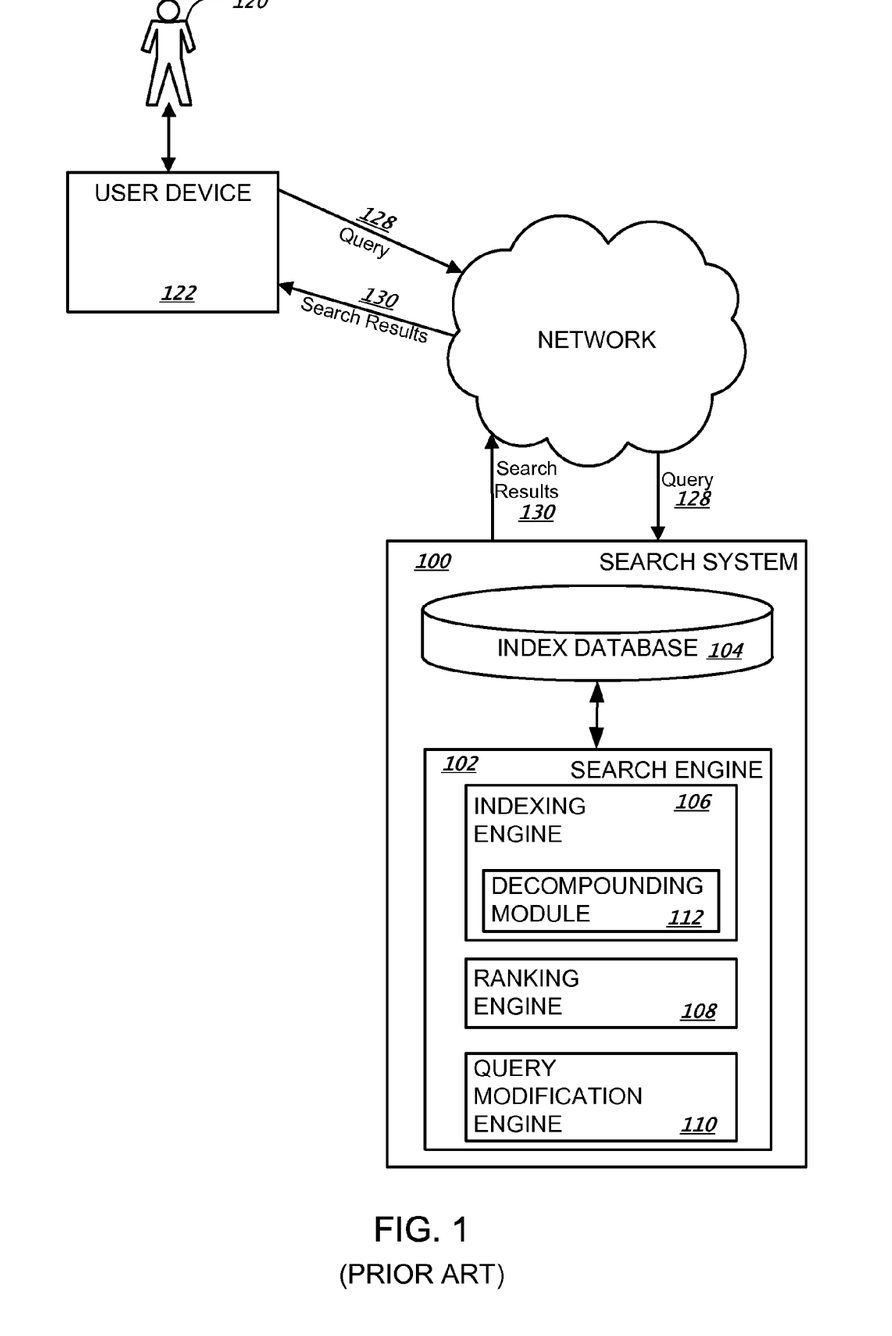
FIG. 1 illustrates an example prior art search system for providing search results relevant to submitted queries.

FIG. 1 illustrates an example prior art search system 100 for providing search results relevant to submitted queries as can be implemented in an Internet, an intranet, or another client and server environment. The search system 100 can be implemented as, for example, computer programs running on one or more computers in one or more locations that are coupled to each other through a network.

The search system 100 includes a search engine 102 and an index database 104. The search engine 102 includes an indexing engine 106 that indexes resources found in a corpus, a ranking engine 108, or other software to rank the resources that match user queries, and a query modification engine 110 to modify queries received from users. A corpus is a collection or repository of resources. Resources are, for example, web pages, images, or news articles. In some implementations, the resources are resources on the Internet.

The ranking engine 108 ranks the resources that match user queries. The ranking engine 108 ranks the resources, for example, using conventional techniques.

The indexing engine 106 receives information about the contents of resources, e.g., tokens appearing in the resources that are received from a web crawler, and indexes the resources by storing index information in the index database 104. While one index database 104 is shown in FIG. 1, in some implementations, multiple index databases 104 can be built and used. The indexing engine 106 indexes the contents of resources, for example, using conventional techniques and using a decompounding module 112.

The decompounding module 112 identifies compound tokens in the text of resources and decompounds the compound tokens. For example, the decompounding module 112 can decompound a compound token, resulting in two or more decompounded tokens. The decompounding module then stores data associating each of the decompounded tokens with the appropriate resources. A token is a string of characters separated from other characters by white space, e.g., spaces, tabs or hard returns, or punctuation. A compound token is a token containing two or more sub-tokens each having semantic meaning. For example, if a resource contained the token "firehouse," the decompounding module would associate the resource with the tokens "fire" and "house" in the index database 104. The decompounding module 112 identifies and decompounds compound tokens, for example, using conventional methods. If a compound can be decompounded in multiple ways, the decompounding module 112 can associate all of the possible decompounded tokens with the resource in the index database 104. For example, if the compound "useswords" appears in the index, the decompounding module 112 can associate the decompounded tokens "use" and "swords" as well as the decompounded tokens "uses" and "words" with the resource in the index.

In some implementations, the indexing engine 106 and the decompounding module 112 associate a resource with both the compound token and its corresponding decompounded tokens. For example, a resource containing the token "firehouse" would be associated with the tokens "firehouse," "fire," and "house" in the index database 104. In some implementations, the decompounding module 112 also stores data associating the decompounded tokens with the compound token from which they were identified. For example, "fire" and "house" could be associated with the token "firehouse." The decompounding module 112 can also store data indicating the order of the tokens in the compound, e.g., data indicating that "fire" came before "house" in the compound token "firehouse."

In some implementations, the decompounding module 112 also stores data in the index that identifies each decompounded token as having been identified from a compound token in a resource. For example, the decompounding module 112 can add a prefix to each decompounded token that identifies the token as having been identified from a compound token in the resource.

A user 120 interacts with the search system 100 through a user device 122. For example, the device 122 can be a computer coupled to the search system 100 through a local area network (LAN), a wide area network (WAN), e.g., the Internet, or a wireless network, or a combination of them. In some implementations, the search system 100 and the user device 122 can be the same computer. For example, a user can install a desktop search application on the user device 122. The user device 122 will generally be a computer.

When the user 120 submits a query 128 to the search engine 102 within the search system 100, the query 128 is transmitted through a network, if necessary, to the search engine 102. The search engine modifies the query using the query modification engine 110 as appropriate. In implementations where decompounded tokens are marked in the index database to distinguish them from tokens in their original form, the query modification engine 110 modifies the query to include both the tokens of the query and the tokens of the query with data identifying them as decompounded tokens. For example, if a user searches for "fire fighter station," the query modification engine could modify the query to be "(fire OR *dc*fire) (fighter OR *dc*fighter) (station OR *dc*station)," where "*dc*" is the prefix used to denote decompounded tokens that appear in the resource as part of a longer compound token. The query modification engine 110 can also make other conventional modifications to the query.

In some implementations, before modifying the query, the query modification engine 110 determines whether to modify the query, for example, by evaluating one or more criteria. For example, the query modification engine 110 can determine whether the query is longer than one word and is expected to get less than a threshold number of results. If so, the query modification engine 110 modifies the query; otherwise, the query modification engine does not modify the query. As another example, the query modification engine 110 can determine whether a particular token is an entity name, e.g., by comparing the token to a list of known entity names. The query modification engine 110 can then only add the token, with data identifying the token as a decompounded token, to the query when the token is not an entity name.

The search engine 102 uses the index database 104 to identify resources that match the tokens of the modified query. The search engine 102 transmits search results 130 identifying the highest-ranked matching resources through the network to the user device 122, for example, for presentation to the user 120 (e.g., in a search results web page that is displayed in a web browser running on the user device 122).

Figure 2:
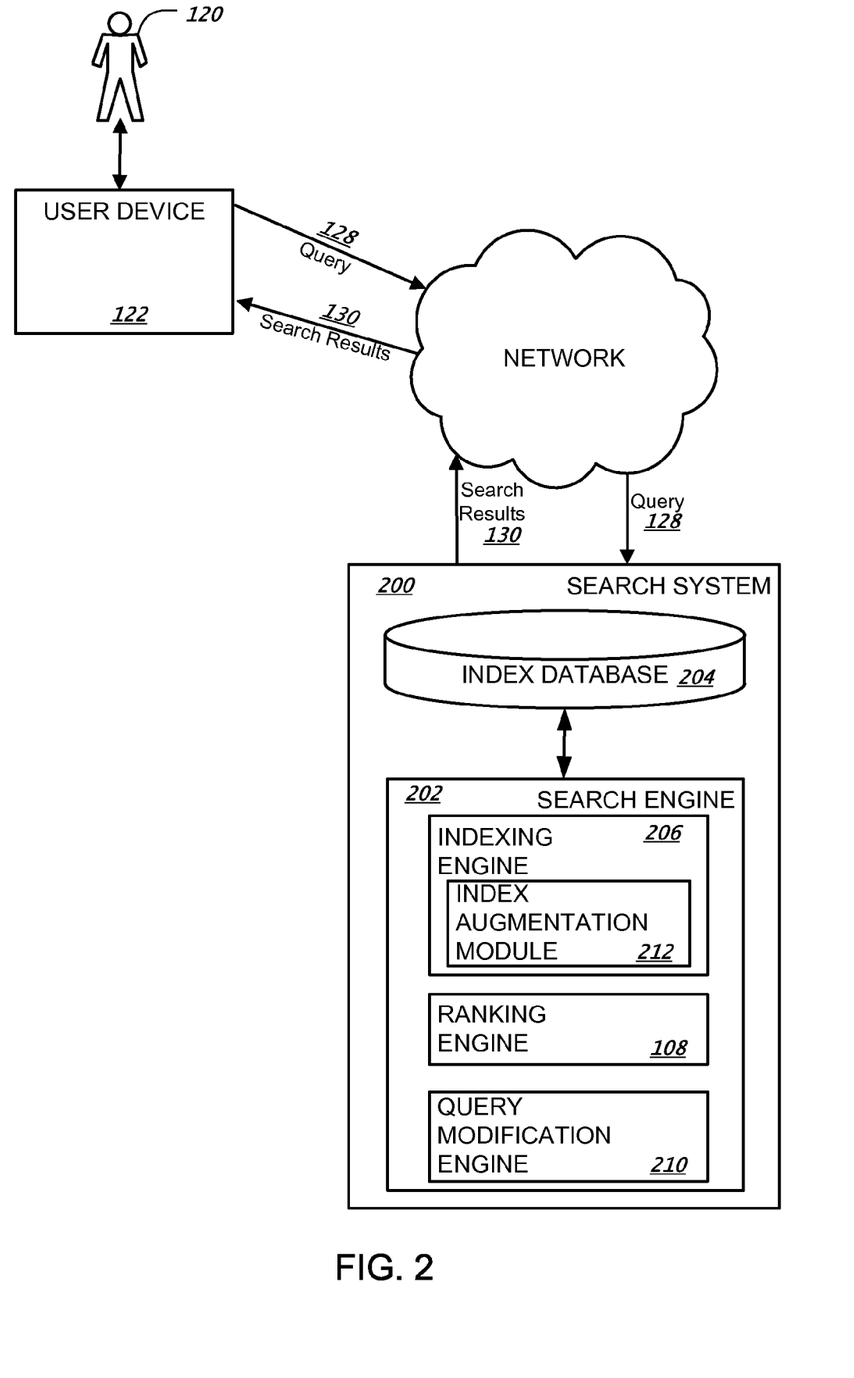
FIG. 2 illustrates an example search system with an augmented index.

FIG. 2 illustrates an example search system 200 with an augmented index database 204. While a single index database 204 is shown in FIG. 2, in some implementations, multiple index databases can be built and used using the methods described below.

Like the prior art search system 100 described above with reference to FIG. 1, the search system 200 provides search results relevant to submitted queries and can be implemented in an Internet, an intranet, or other client and server environment. However, the search system 200 differs from the prior art search system 100 described above with reference to FIG. 1 in at least two ways.

First, instead of a decompounding module 112, the search system 200 has an index augmentation module 212. The index augmentation module 212 adds additional information to the index database 204 other than decompounded versions of tokens found in resources.

Second, the query modification engine 210 in the system 200 modifies queries differently than the query modification engine 110 does. Both of these differences will be described in more detail below.

The index augmentation module 212 processes the text of resources and resource metadata to do one or more of the following: (1) extract one or more numeric portions from each of one or more tokens in the resources or in the resource metadata and add the numeric portions to the index database 204, and (2) identify one or more stopword prefixes in each of one or more tokens of the resources or in the resource metadata and add a normalized form of the one or more tokens, without the stopword prefixes, to the index database 204. Adding numeric portions of tokens to the index database 204 is described in more detail below with reference to FIG. 3. Adding normalized forms of tokens to the index database 204 after removing stopword prefixes is described in more detail below with reference to FIG. 5.

The query modification engine 210 modifies queries as needed to take advantage of the additional information stored by the index augmentation module 212 in the index database 204. The modifications performed by the query modification engine 210 depend on the types of augmentation that the index augmentation module 212 provides. Query modifications that are made when the index augmentation module adds numeric portions to the index database 204 are described in more detail below with reference to FIG. 4. Query modifications that are made when the index augmentation module 212 normalizes tokens to remove stopword prefixes are described in more detail below with reference to FIG. 6.

Figure 3:
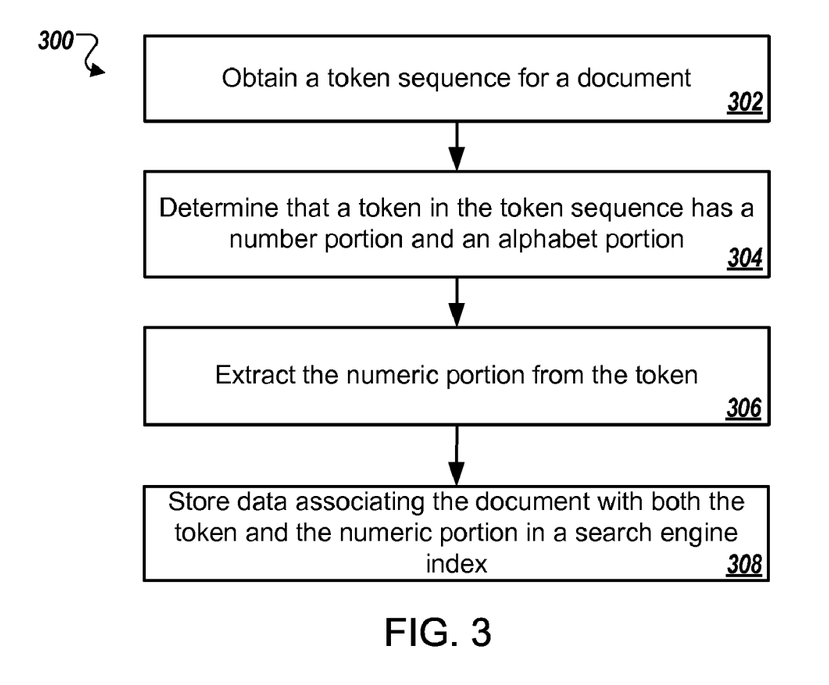
FIG. 3 is a flow chart of an example method for augmenting an index with numeric portions extracted from tokens in resources.

FIG. 3 is a flow chart of an example method 300 for augmenting an index with numeric portions, e.g., numbers, extracted from tokens in resources. For convenience, the method 300 is described in reference to a system of one or more computers that performs the steps of the method. The system can be, for example, the search system 200 described above with reference to FIG. 2.

The system obtains a token sequence for a resource (302). The token sequence is made up of tokens extracted from the resource or metadata for the resource. In some implementations, the tokens in the token sequence are ordered, e.g., according to their relative positions in the resource. For example, a resource containing the phrase "I love puppies—they are adorable" would have the ordered token sequence ["I" "love" "puppies" "they" "are" "adorable"]. The sequence of tokens can be obtained, for example, from a web crawler that is part of the system, or from a separate system.

The system then indexes the tokens in the token sequence. For at least one token in the token sequence, the system performs the following steps to index the token. In some implementations, the system performs the following steps to index each token in the token sequence.

The system determines that the token has a numeric portion of one or more contiguous numeric characters and a non-numeric portion of one or more non-numeric characters (304). In some implementations, the beginning of the numeric portion is delimited by the beginning of the token or a non-numeric character, and the end of the numeric portion is delimited by the end of the token or a non-numeric character. In other words, the numeric portion is not a subsequence of a longer sequence of numbers in the token. For example, in the token "e42PC," the numeric portion would be "42."

The system extracts the numeric portion from the token (306) by generating a new token corresponding to just the numeric portion. For example, if the token is "e42PC," the system extracts the numeric portion "42."

The system stores data associating the resource with both the token and the numeric portion as a separate token, but not any non-numeric portions, in a search engine index (308). The token and the numeric portion are stored as index terms for the resource. For example, the system can store data associating the resource with information in an index database such as the index database 204 described above with reference to FIG. 2. In some implementations, the system denotes the numeric portion, e.g., by storing data indicating that the numeric portion is derived from a token in the resource but was not the actual token in the resource. For example, the system can add a prefix to the numeric portion that indicates that the numeric portion was extracted from a token, before associating the numeric portion with the resource. In some cases, the numeric portion does not appear by itself as a token in the resource.

In some implementations, the system further associates the token with the extracted numeric portion in the index. For example, the system can store data indicating that the token, and the numeric portion extracted from the token, correspond to the same token in the resource. In some implementations, the system can also store data indicating the position of the numeric portion relative to any non-numeric portions or other numeric portions in the token. For example, if the token is "e42PC," the system could store data indicating that the numeric portion "42" came between the non-numeric portions "e" and "PC."

In some implementations, the system can extract multiple numeric portions from the token and associate each individual numeric portion with the resource, and optionally with the token. For example, if the token is "e42PC148," the system could extract both "42" and "148" and associate both numeric portions with the resource. Similarly, if the token is "e42PC148×9," the system could extract "42," "148," and "9." In these implementations, the system can also store data indicating the position of each numeric portion relative to any non-numeric portions or any other numeric portions.

Figure 4:
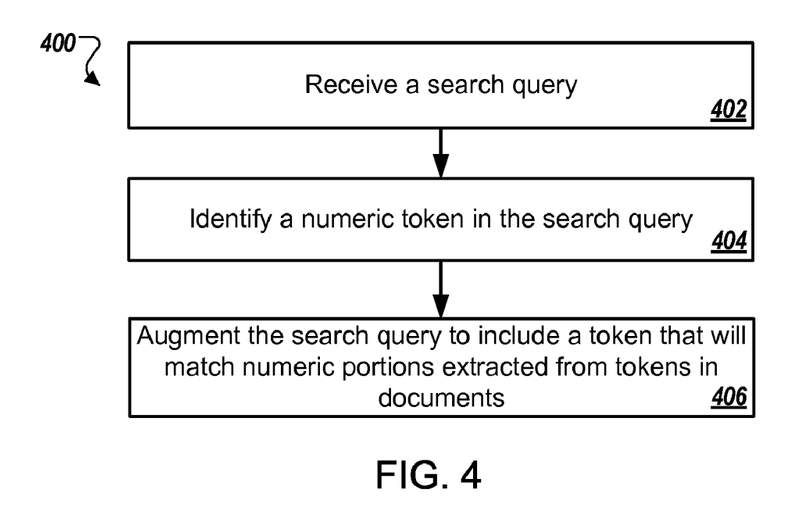
FIG. 4 is a flow chart of an example method for augmenting a query with information needed to retrieve information from an index augmented with numeric portions extracted from tokens in resources.

FIG. 4 is a flow chart of an example method 400 for augmenting a query with information needed to retrieve information from an index augmented with numeric portions extracted from tokens in resources. For convenience, the method 400 is described in reference to a system of one or more computers that performs the steps of the method. The system can be, for example, the search system 200 described above with reference to FIG. 2.

The system receives a search query (402), for example, as described above with reference to FIG. 1. The search query contains one or more tokens.

The system performs the following steps for one or more tokens in the search query. The system identifies a numeric token in the search query (404). The numeric token is a token containing only numeric characters, for example, "123456."

The system augments the search query to include a token that will match numeric portions extracted from tokens in the indexed resources (406). This augmentation causes the search engine to identify resources matching the tokens of the query, and resources having a matching numeric portion extracted from tokens in the resource, as responsive to the query. For example, if the search engine index identifies numeric portions extracted from resources using a prefix, the system can add the numeric portion with the prefix identifier that denotes it as being a variant, to the query. Consider an example where the search query is "42 PC," and the system is processing the numeric token "42." The system would modify the search query "42 PC" to be "(42 OR *np*42) PC," where "*np*" is a prefix used to denote a numeric portion extracted from a token.

In some implementations, the system assigns weights to the tokens in the augmented query. For example, the system can assign less weight to the tokens added to the query than to the tokens in the received query to reflect the fact that variants generally have at least slightly different meanings than their corresponding original tokens, and therefore may not be exactly what the user who submitted the search query intended. Consider an example where a first resource and a second resource are identical, except that the first resource contains the tokens in the received query and the second resource does not contain the tokens in the received query and instead contains the numeric portion token added to the query. If the numeric portion token added to the query is assigned less weight than the tokens in the received query, the first resource will be ranked more highly than the second resource. In some implementations, the amount of the difference between the weights that the system assigns to the tokens added to the query and the tokens already in the query is derived from one or more factors of the query itself, for example, the length of the query. For example, the system can assign a greater difference in weights to tokens identified for shorter queries than to tokens identified for longer queries.

In some implementations, before augmenting the query, the system determines whether the query should be augmented. For example, the system could evaluate a criterion that specifies that if the query only contains one token, the query should not be augmented. As another example, the system can evaluate a number of predicted results for the original query. If the number of predicted results satisfies a threshold, the system can determine not to augment the query. In such implementations, the system only augments the query if the result of the evaluation of the one or more criteria indicates that the query should be augmented. Alternatively or additionally, the system can evaluate one or more criteria regarding an individual token of the query to determine whether to add variants of the individual token to the query. For example, the system could evaluate a criterion that specifies that if a token has less than a threshold length, e.g., one character, a numeric portion token corresponding to the token should not be added to the query.

Figure 5:
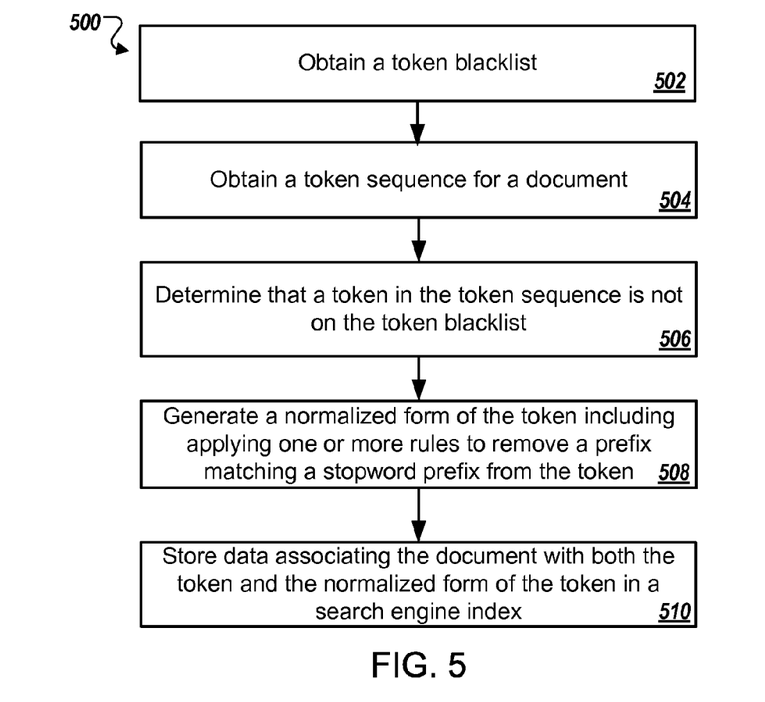
FIG. 5 is a flow chart of an example method for augmenting an index with stopword prefix normalization information.

FIG. 5 is a flow chart of an example method 500 for augmenting an index with stopword prefix normalization information. For convenience, the method 500 is described in reference to a system of one or more computers that performs the steps of the method. The system can be, for example, the search system 200 described above with reference to FIG. 2.

The method described in FIG. 5 is used to index resources in languages that use stopword prefixes. A prefix, as used herein, is the beginning of a word as it is read in the language. For languages, such as English, that are read left to right, the prefix is on the left side of the word. However, for languages, such as Arabic, that are read right to left, the prefix is on the right side of the word. A stopword is a known term that does not contribute to the topicality of a phrase, for example "a" or "the." In some languages, like English, stopwords are usually separate words. However, in some languages, like Arabic, stopwords can appear as stopword prefixes of words in the language. For example, أالمستقبل means "the future" in Arabic. The prefix أل at the right side of the word means "the," and the rest of the word مستقبل means "future." An example list of stopword prefixes in Arabic (written in Romanized form, for convenience) is [Lam, Kaf, Faa, Baa, Waw, Ao, AlefLam].

The system obtains a blacklist (502). The blacklist is a list of words that each begin with a prefix matching a stopword prefix, but where the prefix does not act as a stopword in the context of the word. For convenience, assume English supports stopword prefixes, and "but" is a stopword prefix in English. "Butterfly" begins with the word "but," but "terfly" is meaningless in the English language. Therefore, "butterfly" would be on the blacklist. In some implementations, the blacklist is generated as described below with reference to FIGS. 7 and 8.

The system obtains a token sequence for a resource (504), for example, as described above with reference to FIG. 3. The system then indexes the tokens in the token sequence. For at least one token in the token sequence that begins with a stopword prefix, the system performs the following steps to index the token. In some implementations, the system performs the following steps to index each token in the token sequence.

The system determines that the token is not included on the blacklist (506). The system determines that the token is not on the blacklist, for example, by comparing the token to the words included in the blacklist and determining that the token does not match any of the words in the blacklist.

The system generates a normalized form of the token (508). If the token does not begin with a prefix matching a stopword prefix, the normalized form can be the token itself. If the token does begin with a prefix matching a stopword prefix, the normalized form of the token is generated by removing the prefix matching the stopword prefix from the token. For example, the system can apply one or more prefix removal rules that specify what the stopword prefixes are and how to remove them from tokens. Some languages support compound stopword prefixes. For example, in Arabic, FaaAlefLam (written in Romanized form, for convenience) is a compound stopword prefix composed of two stopwords "Faa" and "AlefLam." Therefore, the rules can specify how to remove a compound stopword prefixes from a token.

In some implementations, the system removes only the longest prefix matching a stopword prefix. In other implementations, the system repeatedly processes the token, removing one stopword prefix in each processing step, until no more stopword prefixes are removed or the resulting token, after the prefix is removed, is on the blacklist.

In some implementations, the system also performs other normalizations. For example, the system can remove diacriticals from the token by applying one or more rules that map characters with diacriticals to characters without diacriticals. These rules can be obtained, for example, using conventional techniques.

The system stores data associating the resource with both the normalized form of the token and the token (510). The token and the normalized form are stored as index terms for the resource. For example, the system can store information in an index database such as the index database 204 described above with reference to FIG. 2. In some implementations, the system denotes the normalized form, e.g., by storing data indicating that the normalized form of the token is derived from a token in the resource but was not the actual token in the resource. For example, the system can add a prefix to the normalized form of the token that indicates that it is a prefix normalized form before associating the normalized form with the resource. In some cases, the normalized form of the token does not appear anywhere in the resource.

In some implementations, before associating the resource with both the normalized form of the token and the token, the system compares the normalized form of the token and the token itself to determine whether they are different. If the two are different, the system associates the resource with both the particular token and the normalized form of the particular token. If the two are the same, the system only associates the resource with the token. This saves space in the index by reducing the number of duplicate tokens that are stored. In some implementations, the system generates the normalized form of the token and compares it to the token before comparing the token to the tokens on the blacklist.

Figure 6:
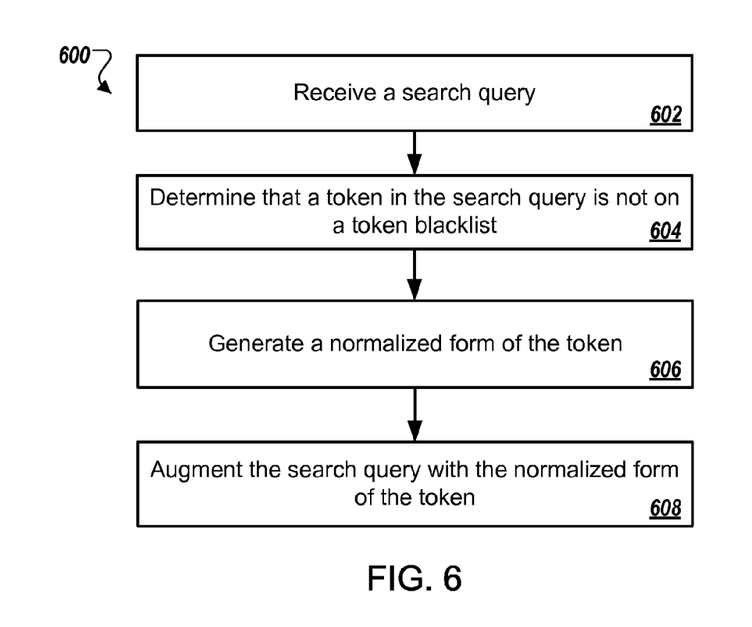
FIG. 6 is a flow chart of an example method for augmenting a query with stopword prefix normalizations.

FIG. 6 is a flow chart of an example method 600 for augmenting a query with stopword prefix normalizations. For convenience, the method 600 is described in reference to a system of one or more computers that performs the steps of the method. The system can be, for example, the search system 200 described above with reference to FIG. 2.

The system receives a search query (602), for example, as described above with reference to FIG. 1. The search query contains one or more tokens.

The system determines that a token in the search query is not on a blacklist (604). The blacklist is described above with reference to FIG. 5. The system generates a normalized form of the token (606), for example, as described above with reference to FIG. 5. The system can also make additional normalizations, for example, as described above with reference to FIG. 5. The system augments the search query with the normalized form of the token (608). This augmentation causes the search engine to identify resources matching any of the tokens of the query or the normalized form of the token as responsive to the query.

If the normalized form of the token is different from the token in the search query, the system augments the search query by adding the normalized form to the search query. If the search engine index denotes normalized forms, for example, using a prefix, the system can add both the normalized form, and the normalized form with the prefix that denotes it as being a normalized form, to the query. Consider the following example. For convenience, assume that English is a language that supports stopword prefixes, and that "the" is an English stopword prefix. Consider an example where the query term is "thefuture," and the normalized form of the query term is "future." The system would augment the query to be "(thefuture OR future OR *sp*future)," where "*sp*" is the prefix used to denote a normalized form with stopword prefixes removed. If the query token is the same as the normalized form of the token, the system can just add the normalized form, with the information identifying the normalized form as being a normalized form, to the query, and not add the normalized form by itself. Consider an example where the query term is "future" in Arabic and the normalized form of the query term is also "future." The system would augment the query to be "(future OR *sp*future)," where "*sp*" is the prefix used to denote a normalized form with stopword prefixes removed.

In some implementations, the system assigns weights to the tokens in the augmented query. For example, the system can assign less weight to the tokens added to the query than to the tokens in the received query to reflect the fact that the modified query may not be exactly what the user who submitted the search query intended. The weights can be assigned for example as described above with reference to FIG. 4. In some implementations, before augmenting the query, the system determines whether the query should be augmented, for example, by evaluating one or more criteria as described above with reference to FIG. 4. Alternatively or additionally, the system can evaluate one or more criteria regarding an individual token of the query to determine whether to add variants of the individual token to the query. For example, the system can determine whether the token is a name of an entity, e.g., by comparing the token to a list of entity names, and can decide to not generate a normalized form of the token if it is an entity name.

Figure 7:
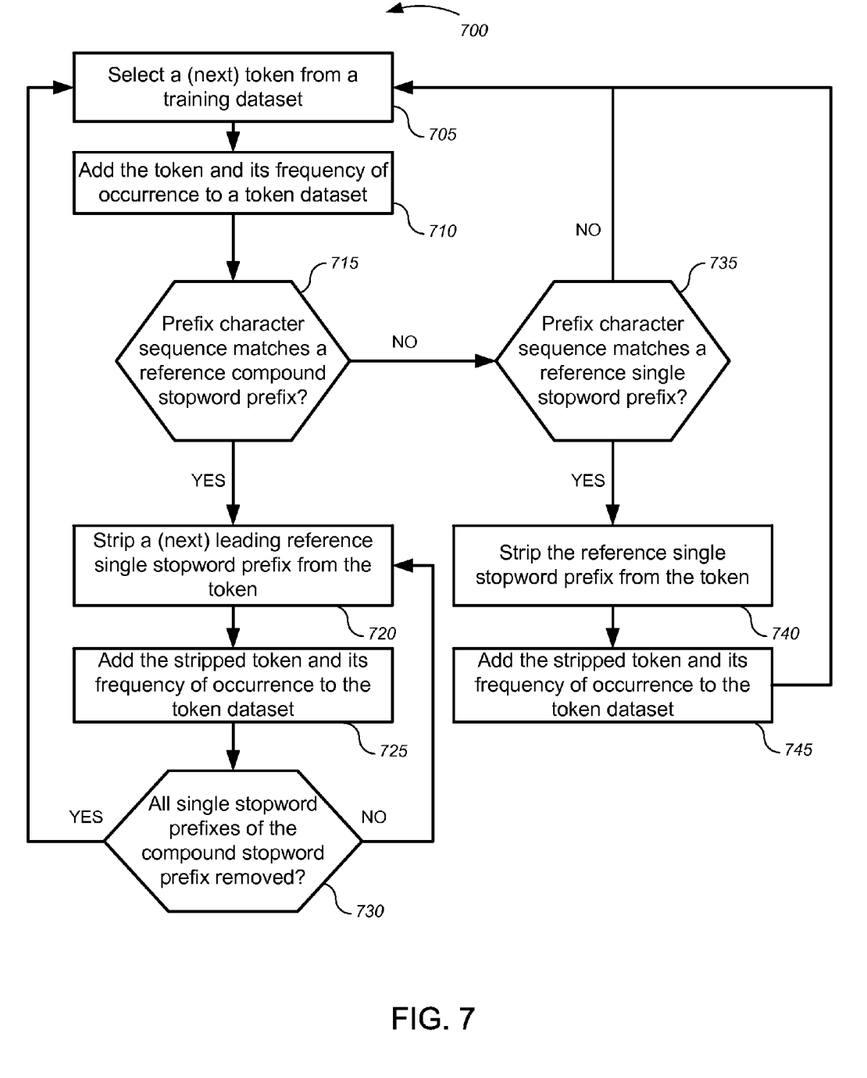
FIGS. 7 and 8 are flowcharts of example methods for building a token blacklist.
Figure 8:
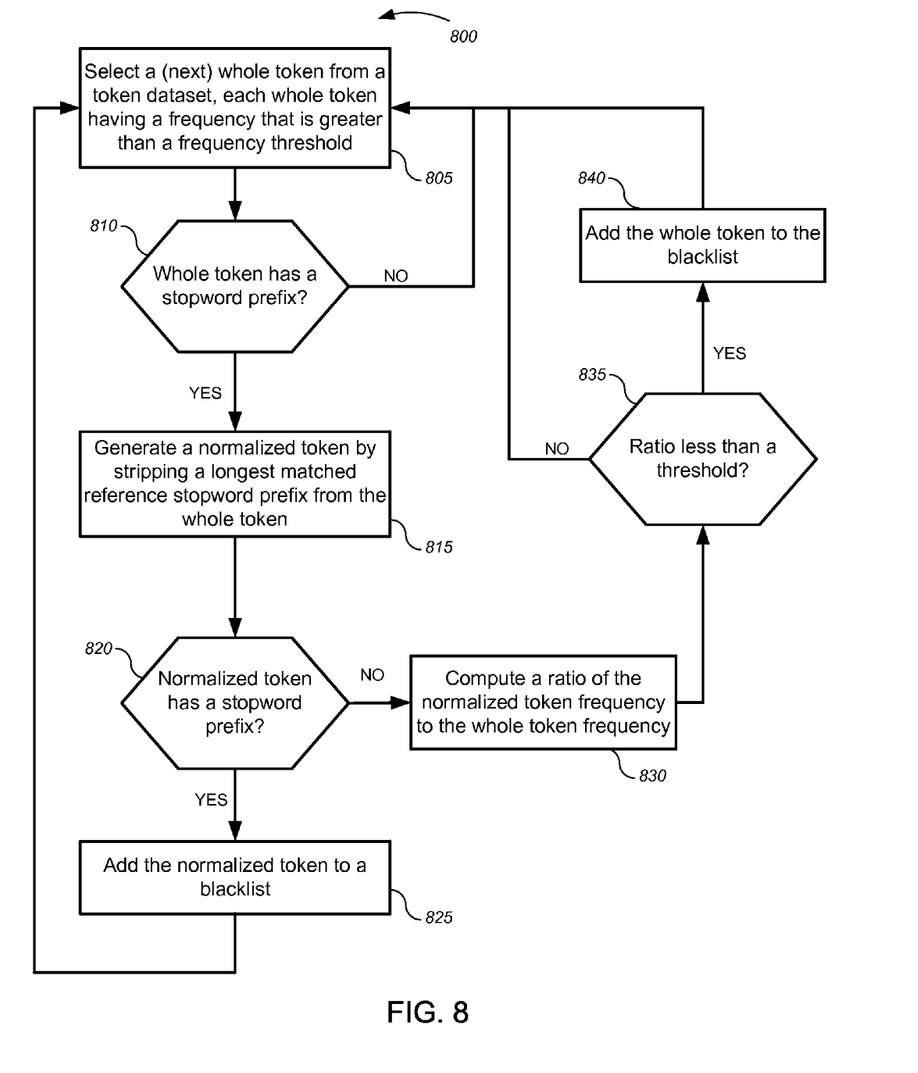

FIGS. 7 and 8 describe example methods for building the token blacklist.

FIG. 7 is a flow diagram of an example method 700 for determining a token dataset of tokens derived from a training dataset along with their respective frequencies of occurrence within the training dataset. For convenience, in the following discussion, "frequencies" is used to mean "frequencies of occurrence." For convenience, the method 700 will be described with respect to a system of one or more computers that performs the method 700.

The system selects a token from the training dataset (705) and adds the token and its frequency in the training dataset to the token dataset (710). The training dataset can be made up of commonly used tokens from a target language. The training dataset may be assembled from collected samples of common language usage such as web documents and user queries.

The system determines whether a prefix sequence of the token matches a reference compound stopword prefix (715) in a reference set of stopword prefixes. If there are multiple matches, the longest one is selected. The reference set of stopword prefixes is a set of all known valid stopword prefixes in the language of the resources in the training dataset. The reference set of stopword prefixes includes single stopword prefixes and, if they exist in the language, compound stopword prefixes. Compound stopword prefixes are sequences of single stopword prefixes that are correct stopword prefixes in the language. The reference set includes data identifying the compound stopword prefixes as compound stopword prefixes.

If the prefix character sequence of the token matches a reference compound stopword prefix, the system repeats the following steps until the compound stopword prefix is removed. The system strips a leading single stopword prefix from the token (720) and adds the resulting stripped token and its respective frequency of occurrence in the training dataset to the token dataset (725). Not all stripped tokens may occur in the training dataset, and thus a stripped token added to the results set may have a frequency of zero. After all the single stopword prefixes of the compound stopword prefix have been removed (730), the system selects another token (705).

Processing a token determined to have a prefix character sequence matching a reference compound stopword prefix can generate multiple token entries in the token dataset. For example, a hypothetical Arabic token determined to have a prefix character sequence matching the compound stopword prefix FaaAlefLam would generate the following three tokens:

1. FaaAlefLamXYZ (the word XYZ with the compound stopword prefix)
2. AlefLamXYZ (outermost single stopword prefix Faa removed)
3. XYZ (outermost single stopword prefix AlefLam removed)

If the prefix character sequence of the token does not match a compound stopword prefix, the system determines whether the prefix character sequence matches a single stopword prefix (735). If so, the single stopword prefix is stripped from the token (740), and the stripped token and its respective relative frequency are added to the token dataset (745). For example, a hypothetical Arabic token determined to have a prefix character sequence matching the single stopword prefix Faa would generate the following two tokens:

1. FaaXYZ (the word XYZ with the single stopword prefix)
2. XYZ (single stopword prefix Faa removed)

Once the generation of the token dataset has been completed, the system can use the token dataset to generate the blacklist.

FIG. 8 is a flow diagram of an example method 800 for generating the blacklist by adding a token that has a prefix character sequence that appears to be a stopword prefix but is not acting as a stopword prefix to a blacklist. For convenience, the method 800 is described with reference to a system of one or more computers that performs the method.

The system receives a token dataset of tokens and their respective frequencies. The frequencies each represent a frequency in a large collection of written material, and can be generated from a training dataset, for example, as described above with reference to FIG. 7.

The system then processes the results set as follows to generate the blacklist.

The system selects a whole token that has a frequency that is greater than a frequency threshold (805). A whole token is the complete token as it appears in the collection or training dataset, as they case may be. For example, if the training dataset includes the token "firefighter," the whole token would be "firefighter." In some implementations, the frequency threshold is selected so that there is a high degree of confidence that tokens having a frequency above the threshold are commonly used in the language. In some implementations, the threshold is selected based on analysis of the frequencies stored in the token dataset. For example the threshold can be selected so that only tokens with the highest 15% of frequencies satisfy the threshold.

The system determines whether the whole token has a stopword prefix (810). In some implementations, the system makes this determination by matching prefix character sequences of the whole token to a reference set of stopword prefixes, e.g., the reference set used in the method described with reference to FIG. 7.

If no match is found, the system selects a next word from the token dataset (805). If a match is found, the system generates a normalized token by removing the longest matched reference stopword prefix from the whole token (815). Removing the longest matched reference stopword prefix insures that an entire compound stopword prefix can be detected and removed.

The system then uses characteristics of the whole token and the normalized token to determine whether a token has a prefix character sequence that matches a stopword prefix but is not a true stopword prefix in the token.

The system determines whether the normalized token has a prefix that matches a stopword prefix (820). If so, the system adds the normalized token to the token blacklist (825). The system adds the normalized token to the token blacklist to indicate that the normalized token should not be considered to be a token that has a stopword prefix by processes that perform special operations on words that have stopword prefixes.

For illustrative purposes, consider an example where "or" is a valid English stopword prefix, and "orman" is a word in English. Assume that the whole token "ororman" is in the token dataset, and has a high frequency in the training dataset. Assume that the prefix character sequence "or" is a valid stopword prefix and that the sequences "oror" and "oro" are not. The normalized token "orman" is generated from "ororman" by stripping off the longest reference stopword prefix "or". However, the prefix "or" of the normalized token "orman" matches the reference stopword prefix "or" but is not a true stopword prefix. Because prefix character sequence "or" of the normalized token ("orman") matches a stopword prefix ("or") and is an integral part of the token and not a stopword prefix in the context of the token, the system adds the normalized token ("orman") to the blacklist.

If the normalized token does not have a prefix that matches a stopword prefix, the system computes a ratio of the frequency of the normalized token to the frequency of the whole token (830). The system then determines whether the ratio is less than a threshold (835). If the ratio is less than the threshold value, the normalized token appears within the training dataset relatively infrequently compared to the whole token. Thus, the prefix character sequence of the whole token is likely to be integral to the token and not a stopword prefix. Therefore, the system adds the whole token to the blacklist (840). In some implementations, the threshold is selected by hand, for example, from an empirical value analysis of the frequencies. In some implementations, the threshold is selected to be an order of magnitude, for example, ten. For illustrative purposes, consider an example where "but" is a valid English single stopword prefix, and that "butterfly" is a whole token selected from the token dataset because its frequency is high enough and its prefix character sequence matches a valid stopword prefix. The normalized token generated from "butterfly" by stripping off the valid stopword prefix "but" would be "terfly." In this example, the normalized token "terfly" does not have a prefix character sequence that matches a reference stopword prefix. To determine whether or not "but" is functioning as a stopword, the ratio of the frequency of the normalized token ("terfly") to the frequency of the whole token ("butterfly") is compared to a predetermined threshold value. Because the whole token ("butterfly") occurs sufficiently more frequently than the normalized token, the system can determine that "terfly" is not a word in the English language. Therefore, "butterfly" would be added to the blacklist.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
one or more computers programmed to perform operations comprising:
obtaining, at a search system, a token sequence for a resource, wherein each token in the token sequence comprises one or more characters; and
indexing, at the search system, a particular token in the token sequence, wherein the particular token comprises a plurality of characters, the indexing comprising:
determining that the particular token comprises a numeric portion of one or more contiguous numeric characters and a non-numeric portion of one or more non numeric characters;
extracting the numeric portion from the particular token; and
storing data associating the resource with both the particular token and the numeric portion as index terms for the resource, in a search engine index;
receiving, at the search system, a search query comprising one or more tokens including a first token, wherein the first token comprises a number token; and
responsive to matching the first token to the numeric portion from the particular token, augmenting, at the search system, the search query with a new token that matches the numeric portion from said particular token.

2. The system of claim 1, wherein a beginning of the numeric portion is delimited by a beginning of the token or a non-numeric character and an end of the numeric portion is delimited by an end of the token or a non-numeric character.

3. The system of claim 1, wherein indexing the particular token further comprises:
determining that the particular token comprises a second numeric portion; and
associating the resource with the second numeric portion in the search engine index.

4. The system of claim 1, wherein the operations further comprise storing data associating the particular token with the numeric portion.

5. The system of claim 4, wherein:
the operations further comprise determining a respective position of the numeric portion in the particular token relative to the non numeric portion; and
associating the particular token with the numeric portion further comprises associating the numeric portion with the respective position relative to the non numeric portion.

6. The system of claim 1, wherein the operations further comprise storing data indicating that the numeric portion is a numeric portion.

7. The system of claim 1, wherein the operations further comprise assigning a weight to each token in the augmented search query, including assigning a weight to the new token so that resources matching the number token in the search query are weighted more highly than resources matching the new token.

8. A system, comprising:
one or more computers programmed to perform operations comprising:
indexing, at a search system, resources in a language, wherein one or more stopwords in the language appear as prefixes of words in the language;
obtaining, at the search system, a blacklist comprising one or more words that each begin with a prefix matching one of a plurality of stopword prefixes, wherein, for each word on the blacklist, the prefix does not act as a stopword in a context of the word;
obtaining, at the search system, a token sequence for a resource, wherein each token in the token sequence comprises one or more characters;
indexing, at the search system, a particular token in the token sequence that begins with a prefix that matches a stopword prefix, wherein the particular token comprises a plurality of characters, the indexing comprising:
determining that the particular token is not included in the blacklist;
generating a normalized form of the particular token, including removing the prefix matching the stopword prefix from the beginning of the particular token; and
storing data associating the resource with both the particular token and the normalized form of the particular token, as index terms for the resource, in a search engine index;
receiving, at the search system, a search query comprising one or more tokens;
generating, at the search system, a normalized form of a first token in the search query, wherein generating the normalized form comprises removing a prefix matching a stopword prefix from the token; and augmenting, at the search system, the search query with the normalized form of the first token.

9. The system of claim 8, wherein the operations further comprise indexing a second token in the token sequence, the indexing comprising:
generating a normalized form of the second token;
determining that the normalized form of the second token is the same as the second token; and
in response to determining that the normalized form of the second token is the same as the second token, storing data associating the resource with the second token in the search engine index.

10. The system of claim 8, wherein storing data associating the resource with the normalized form of the particular token comprises storing data indicating that the normalized form of the particular token is a normalized form.

11. The system of claim 8, wherein:
the operations further comprise determining that the normalized form is different from the first token; and
augmenting the search query comprises augmenting the search query to include both the normalized form and the normalized form with information identifying the normalized form as a normalized form.

12. The system of claim 8, wherein the operations further comprise:
determining that the normalized form is the same as the first token; and
augmenting the search query to include information identifying the normalized form as a normalized form.

13. The system of claim 8, wherein the operations further comprise:
determining that the first token is not included in a blacklist comprising one or more words that each begin with one of a plurality of stopword prefixes, wherein, for each word in the blacklist, the stopword prefix does not act as a stopword in a context of the word.

14. The system of claim 8, wherein the operations further comprise assigning a weight to each token in the query augmented with the normalized form, including assigning a weight to the normalized form so that resources matching the first token in the search query are weighted more highly than resources matching the normalized form and not the first token.

15. A system comprising:
one or more computers and one or more storage devices storing instructions that when executed by the one or more computers cause the one or more computers to perform operations comprising:
obtaining a set of reference stopword prefixes, wherein each reference stopword prefix is a sequence of characters, and wherein the set of reference stopword prefixes comprises a plurality of single stopword prefixes and a compound stopword prefix that is a sequence of a plurality of single stopword prefixes;
generating a token dataset by:
selecting a first token from a training dataset;
adding the first token and its frequency of occurrence within the training dataset to the token dataset;
determining that a prefix character sequence of the first token matches a reference compound stopword prefix; and
successively stripping a leading reference single stopword prefix from the first token and adding the stripped first token and a frequency of occurrence within the training dataset of the stripped first token to the token dataset until all single stopword prefixes within the reference compound stopword prefix sequence are stripped from the first token,
wherein the token dataset comprises data identifying a plurality of whole tokens and a frequency of occurrence within the training dataset for each of the whole tokens, and data identifying one or more stripped tokens and a frequency of occurrence within the training dataset for each of the stripped tokens;
selecting a whole token from the token dataset if the whole token has a frequency that is greater than a frequency threshold value, and if the whole token has a prefix character sequence that matches a reference stopword prefix;
generating a normalized token by removing a longest matched reference stopword prefix from the whole token;
determining whether or not the normalized token has a prefix character sequence that matches a reference stopword prefix; and
adding a first whole token to the blacklist if a prefix character sequence of a first normalized token does not match a reference stopword prefix, and if a ratio of (i) a frequency of the first normalized token to (ii) a frequency of the first whole token is less than a threshold value.

16. The system of claim 15 wherein the operations further comprise adding a second normalized token to the blacklist if a prefix character sequence of the second normalized word matches a reference stopword prefix.

17. The system of claim 15 wherein generating the token dataset further comprises:
selecting a second token from the training dataset;
adding the second token and its frequency of occurrence within the training dataset to the token dataset;
determining that a prefix character sequence of the second token does not match a reference compound stopword prefix and does match a reference single stopword prefix; and
stripping the reference single stopword prefix from the second token and adding the stripped second token and a frequency of occurrence within the training data set of the stripped second token to the token dataset.

* * * * *